United States Patent
Farchi et al.

(10) Patent No.: US 8,452,813 B2
(45) Date of Patent: May 28, 2013

(54) TEST PLANNING USING ATTRIBUTE VALUE PROPERTIES

(75) Inventors: Eitan Farchi, Pardes Hana (IL); Itay Segall, Tel-Aviv (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 13/285,016

(22) Filed: Oct. 31, 2011

(65) Prior Publication Data

US 2013/0110880 A1  May 2, 2013

(51) Int. Cl.
*G06F 7/00* (2006.01)
*G06F 17/30* (2006.01)

(52) U.S. Cl.
USPC .......................................... 707/792; 707/803

(58) Field of Classification Search
USPC ........................................................ 707/792
See application file for complete search history.

(56) References Cited

U.S. PATENT DOCUMENTS

| | | | |
|---|---|---|---|
| 6,931,627 B2 | 8/2005 | Arbouzov et al. | |
| 7,120,559 B1* | 10/2006 | Williams et al. | 702/185 |
| 7,278,135 B2 | 10/2007 | Czerwonka | |
| 7,640,470 B2 | 12/2009 | Lammel et al. | |
| 2004/0148151 A1* | 7/2004 | Menter et al. | 703/22 |
| 2008/0077515 A1* | 3/2008 | Zoldi et al. | 705/35 |
| 2012/0253770 A1* | 10/2012 | Stern et al. | 703/10 |

* cited by examiner

*Primary Examiner* — Kuen Lu
(74) *Attorney, Agent, or Firm* — F. Jason Far-hadian; Century IP Group (57) ABSTRACT

A method for modeling a test space is provided. The method comprises defining a coverage model including one or more variables, wherein respective values for the variables are assigned, one or more definitions of value properties for said variables with assigned values, and one or more restrictions that limit combination of variable values that are legal for the model, wherein at least one of said restrictions is defined using at least one value property.

20 Claims, 8 Drawing Sheets

| Platform | OS | Allowed? |
|---|---|---|
| xServer | RHEL5.x | Yes. Type matches Platform1 |
| xServer | Win2k3 | Yes. Type matches Platform1 |
| xServer | AIX5.x | No. Type does not match either Platform1 or Platform2 |
| xServer | AIX6.x | No. Type does not match either Platform1 or Platform2 |
| xBlade | RHEL5.x | Yes. Type matches Platform1 |
| xBlade | Win2k3 | Yes. Type matches Platform1 |
| xBlade | AIX5.x | No. Type does not match either Platform1 or Platform2 |
| xBlade | AIX6.x | No. Type does not match either Platform1 or Platform2 |
| pServer | RHEL5.x | Yes. Type matches Platform2 |
| pServer | Win2k3 | No. Type does not match either Platform1 or Platform2 |
| pServer | AIX5.x | Yes. Type matches Platform1 |
| pServer | AIX6.x | Yes. Type matches Platform1 |
| pBlade | RHEL5.x | Yes. Type matches Platform2 |
| pBlade | Win2k3 | No. Type does not match either Platform1 or Platform2 |
| pBlade | AIX5.x | Yes. Type matches Platform1 |
| pBlade | AIX6.x | Yes. Type matches Platform1 |

TEST PLANNING USING ATTRIBUTE VALUE PROPERTIES

COPYRIGHT & TRADEMARK NOTICES

A portion of the disclosure of this document may contain material subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to testing system behavior in a computing environment.

BACKGROUND

Model based techniques may be used for generating tests for verifying the behavior of a computing system. A model includes a set of attributes in addition to values for the attributes and corresponding restrictions on said values or value combinations. The set of valid value combinations defines the space to be tested. In a Cartesian-product based model, the test space is defined as all possible combinations of variable values that are not ruled out by restrictions.

The size of a Cartesian-product based model is the product of the number of values for each attribute (i.e., $A_1 * A_2 * \ldots * A_n$), where $A_n$ represents the number of valid values for the $n^{th}$ attribute. One would appreciate that the size of the model can become prohibitively large, depending on the number of attributes, the possible number of values assigned to each attribute and the restrictions.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for modeling a test space is provided. The method comprises defining a coverage model including one or more variables, wherein respective values for the variables are assigned, one or more definitions of value properties for said variables with assigned values, and one or more restrictions that limit combination of variable values that are legal for the model, wherein at least one of said restrictions is defined using at least one value property.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, a coverage model is used to test a target system. The model defines variables (i.e., attributes), possible values for the variables, and conditions or restrictions indicating when values for one or more variables or value combinations for a plurality of variables are valid or invalid. The set of valid value combinations and requirements for combinations of variables that are to be included in the test plan define the coverage model.

The size of the test space for the model may be defined by the product (e.g., the Cartesian product) of variable values taking into account the dictated conditions or restrictions. The size of the test space is thus approximately proportional to the product of the number of values that can be assigned to each variable. In one embodiment, to reduce the number of tests for testing the system, a subset of the variables whose combinations are to be covered may be defined by way of applying an algorithm (e.g., a combinatorial algorithm) to filter out certain variable combinations.

As such, in one embodiment, a combinatorial algorithm is used to generate a relatively small set of tests that satisfy certain interaction requirements between selected variables. The restrictions for the combination of variable values may be provided as input to a combinatorial test design (CTD) engine. Given a Cartesian-product model with n variables, the combinatorial algorithm finds a subset of valid variable value combinations in the test space that covers possible combinations of every m variables, wherein m defines a certain interaction level.

The interaction level, depending on implementation, refers to the coverage of the selected subset of the test space, wherein the test space covers the possible combinations of m number of variables in the set defined by the respective coverage model—m is less than or equal to the total number of variables n in the model. As an example, interaction level two means that for every two variables all or some valid value combinations appear in the selected subset of the test space. Empirical evidence shows that most bugs may be found when testing the interesting interactions among a relatively small number of variables.

Due to the large number and complexity of variable interactions in a model, defining the restrictions for a system under test according to the above methods may require a high level of skill. This translates into higher costs of hiring and also increased chance for error. For example, consider a system modeled based on the following three variables: (1) hardware platform, (2) operating system (OS), and (3) host bus adaptor (HBA). This hypothetical system may include six different platforms, 17 different operating systems and 11 HBAs with incompatible components.

Figure 1A:
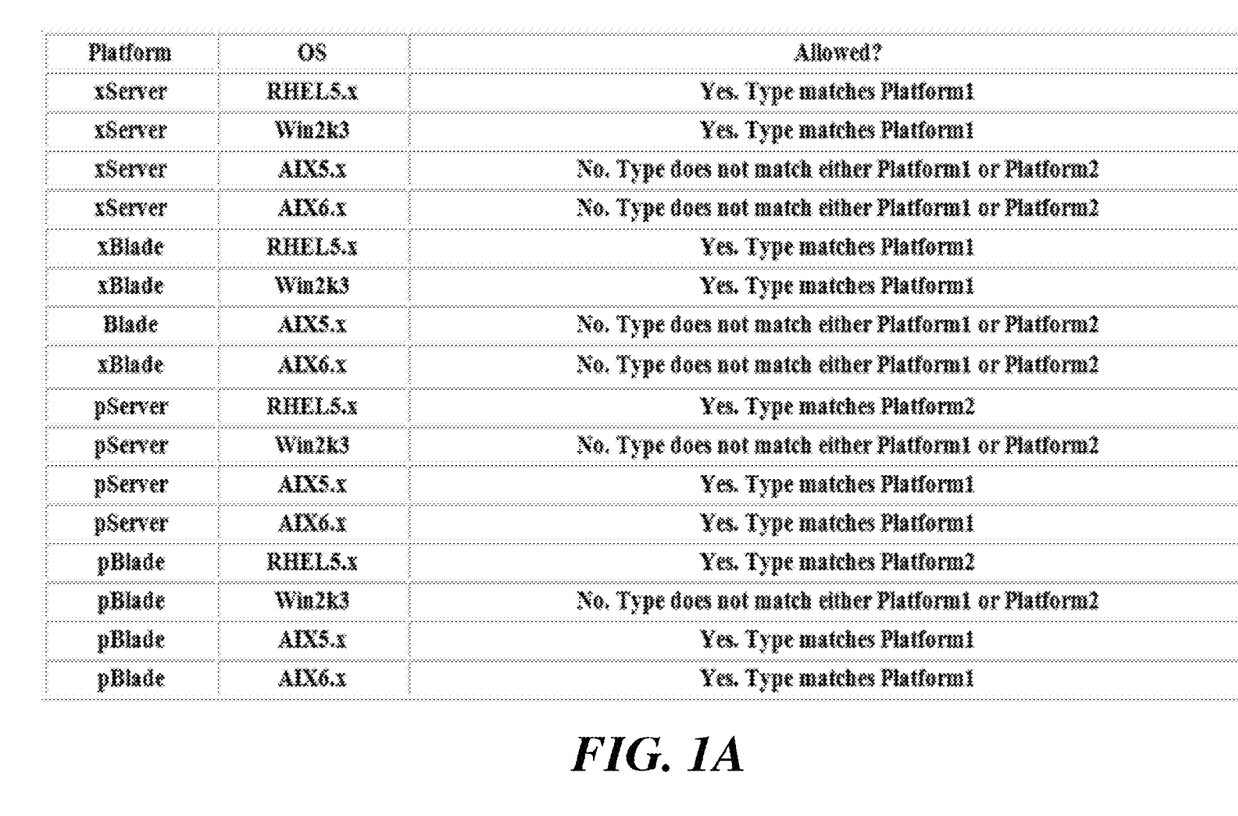
FIG. 1A illustrates an exemplary set of restrictions defined for variable combinations in a model constructed to test a system.

Referring to FIG. 1A, for example, in practice not all OSs may run on all platforms due to a type mismatch (e.g., Windows OS cannot run on pSeries computers), and not all HBAs may be used with every OS. Accordingly, to properly construct the model for this exemplary system, one may have to resort to using programming language expressions or alternatively define a separate restriction for each illegal combination (e.g., "not allowed xServer and AIX.7", "not allowed xServer and AIX.6", "not allowed xBlade and AIX.7", etc.).

Figure 1B:
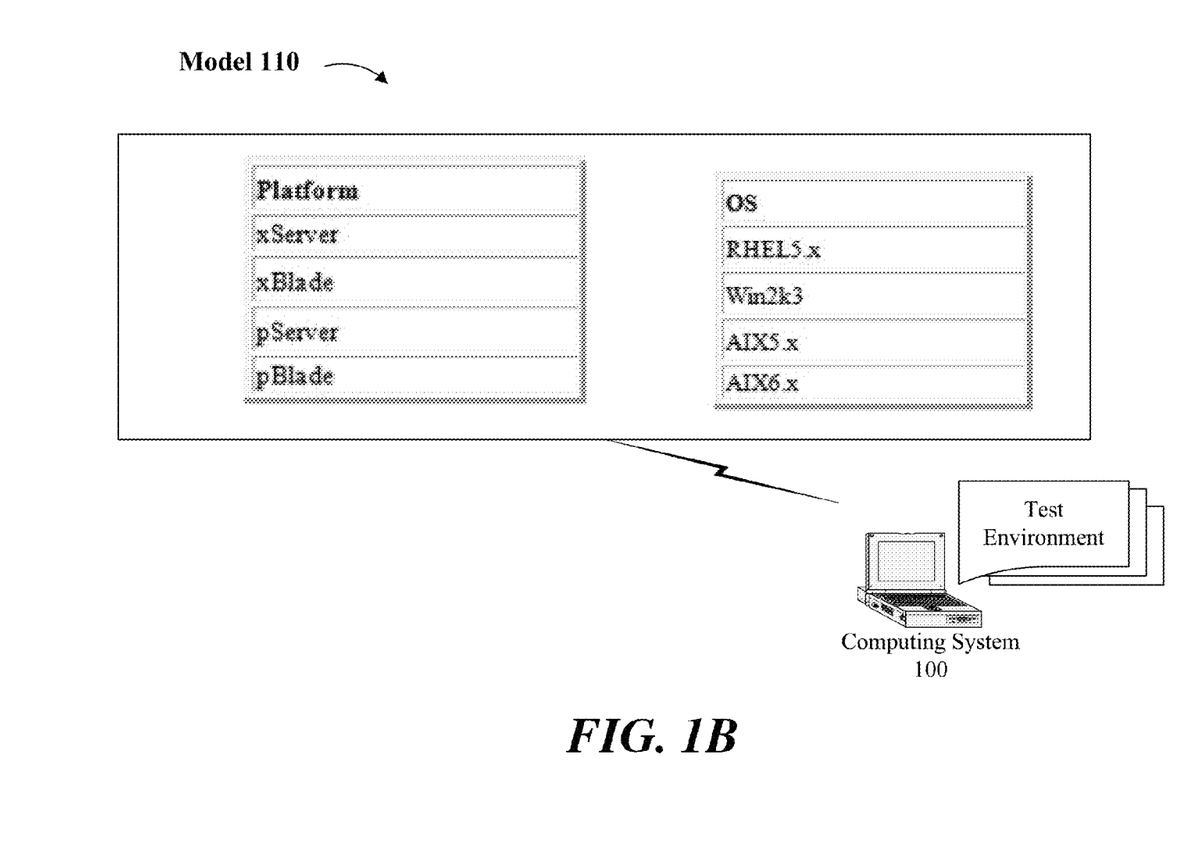
FIGS. 1B through 1E are exemplary illustrations of a model wherein variable values are associated with one or more types, in accordance with one embodiment.

Due to the number of restrictions involved, defining every single restriction based on the above approach may be a time consuming and error prone process. As such, in one embodiment, the model is implemented so that the system variables may be grouped according to their common properties or type. Referring to FIG. 1B, for example, a model 110 is illustrated in which the possible variable values are shown as a list associated with each variable. As shown, the variable "platform" may be assigned values xServer, xBlade, pServer, pBlade, etc.; and the variable "OS" may be assigned values RHEL5.x, Win2k3, AIX5.x, AIX6.x, etc., for example.

As noted earlier, for the above model, the following restrictions may be defined to indicate the match between the OSs and the platforms on which an OS may properly operate:

1. xServer and AIX5.x
2. xServer and AIX6.x
3. xBlade and AIX5.x
4. xBlade and AIX6.x
5. pServer and Win2k3
6. pBlade and Win2k3

Depending on implementation, the matching between variable values may be based on the variable values association with a certain property. For example, in the above pairs, it can be determined that certain OSs may run on both types of platforms, but others may only run on one type of platform. Accordingly, referring to FIG. 1C, each platform may be associated with a type "x" or "p", and each OS may be associated with one or both types "x" or "p". In other words, the properties for the variables are defined per variable, and the respective values for the properties are of a certain type.

Figure 1C:
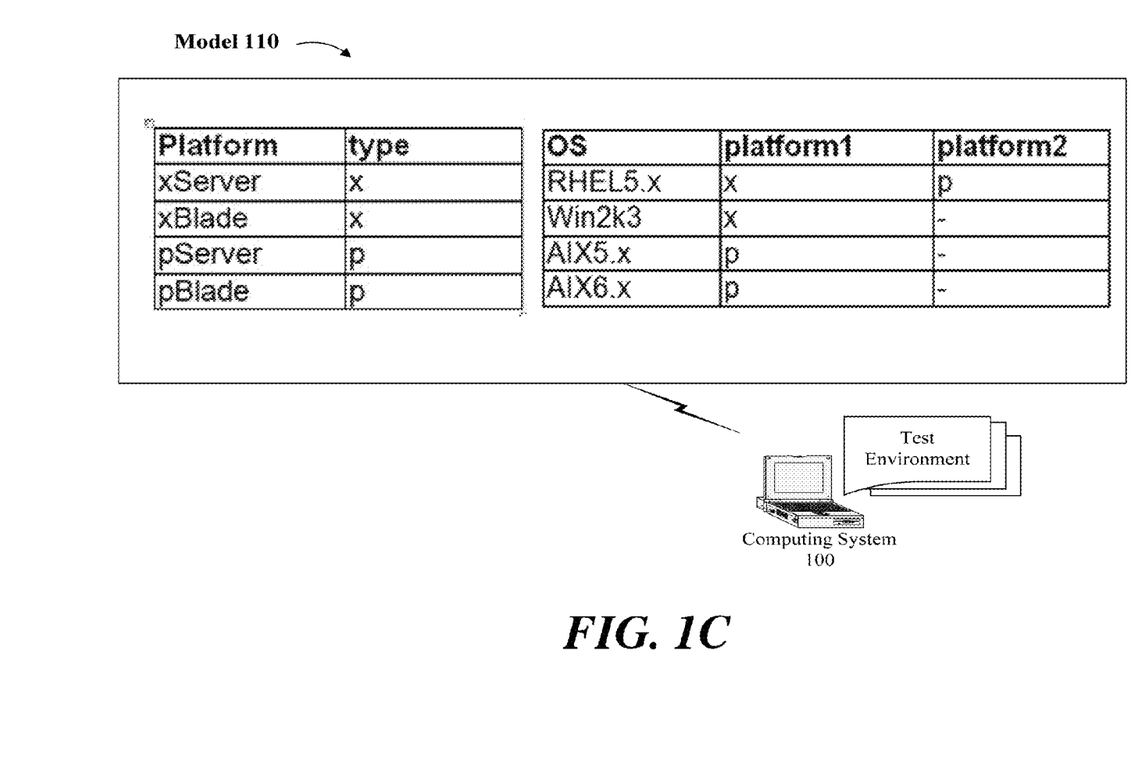

In the above implementation, restrictions may be defined based on property values (e.g., the type associated with each variable). For example, in accordance with one embodiment, instead of having to define the above six restrictions for the model, the following restriction may be defined:

not allowed[(Platform.type!=OS.platform1)
&&Platform.type!=OS.platform2]

Figure 1D:
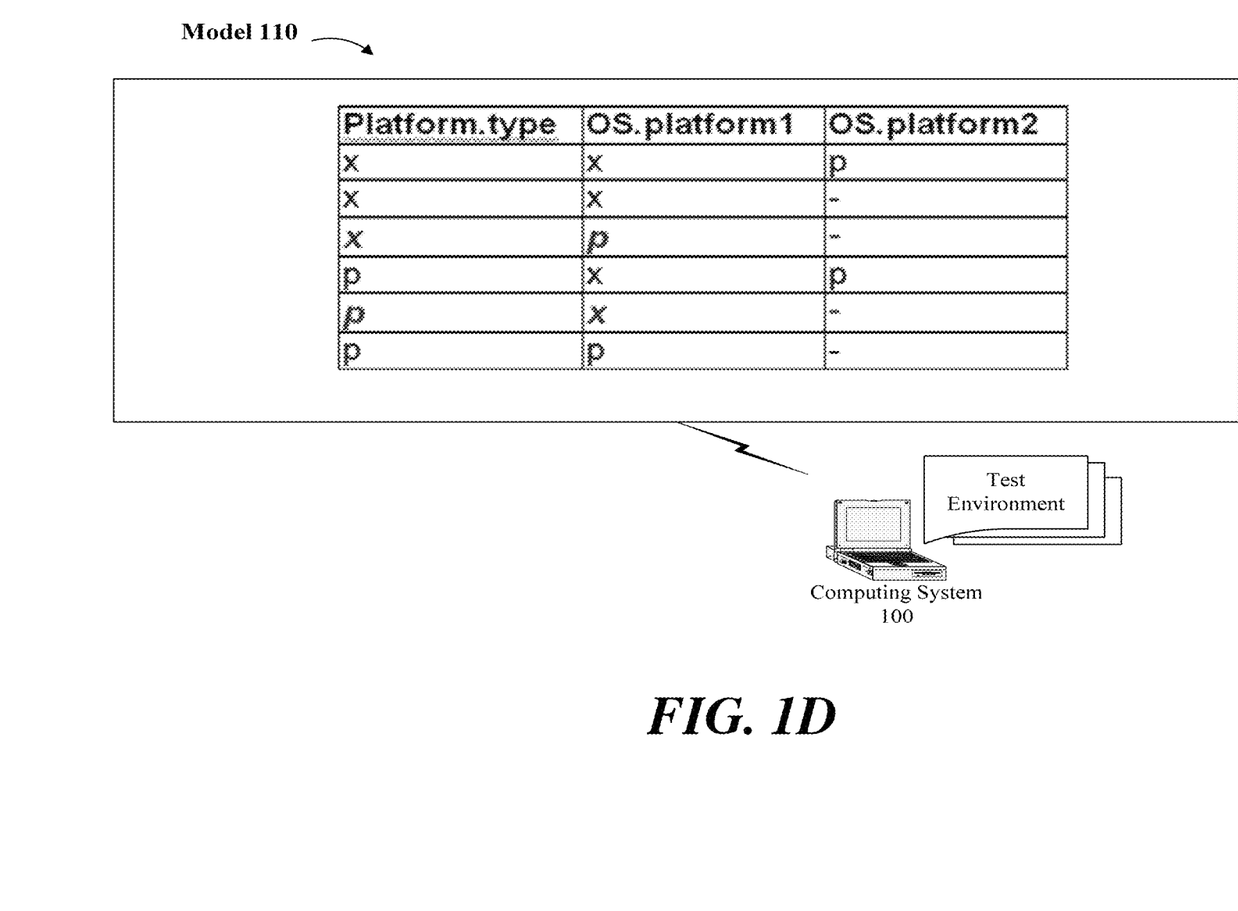

Referring to FIG. 1D, variable properties may also be used in visual or graphical user interfaces to present or mark in abstract the limitations or restrictions associated with one or more variables included in the model based on the semantic information given in the property values for a variable. For example, depending on implementation, a certain color, font, or other property associated with a character that is used to represent a variable may indicate that one or more combinations are illegal. In FIG. 1D, for example, the illegal combinations are shown with italic and bold properties with the variables abstracted.

Figure 1E:
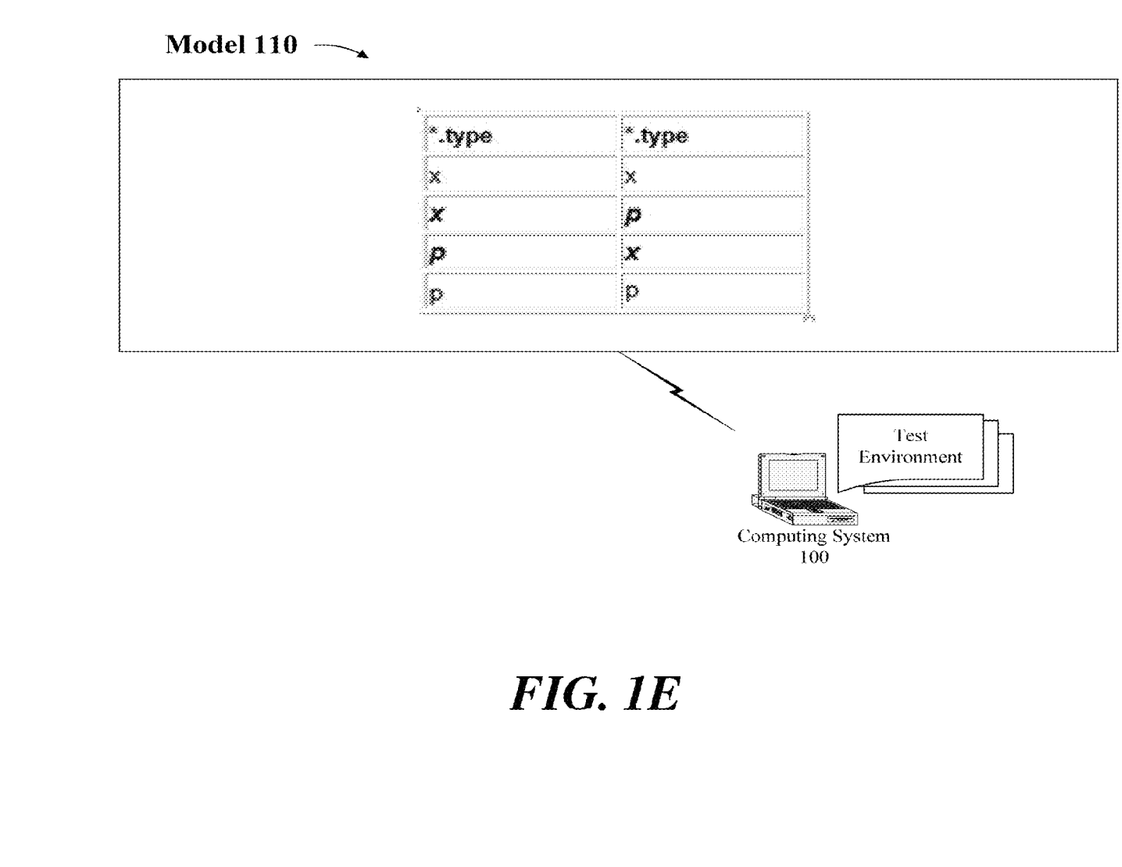

Referring to FIG. 1E, in one embodiment, the variable properties may be abstracted out of restriction. As shown, in using the properties, one may project the properties type, platform1 and platform2 and mark illegal the combinations that would apply to any variable that had the above properties, for example. The markings may be performed using any suitable means that would adequately distinguish in a visual manner, for example, the illegal combinations from the legal combination. The markings may be then be translated into formal restrictions and then applied to the variables that have the marked properties.

Additionally, properties may be used in order to define interaction coverage requirements in a more abstract level. In the above example, the user may require covering interactions of the type of platform (Platform.type) and OS (OS.type). This will usually result in a smaller test plan that exercises more abstract interactions. It is noteworthy that since each variable may have many properties, properties may induce different abstractions of the same variable that may be independent of each other. For example, the "platform" variable may also have another property for power consumption (e.g., low consumption or high consumption). Thus, two independent abstractions of the "platform" variable may be defined, one by its type, and another by its power consumption.

Figure 2:
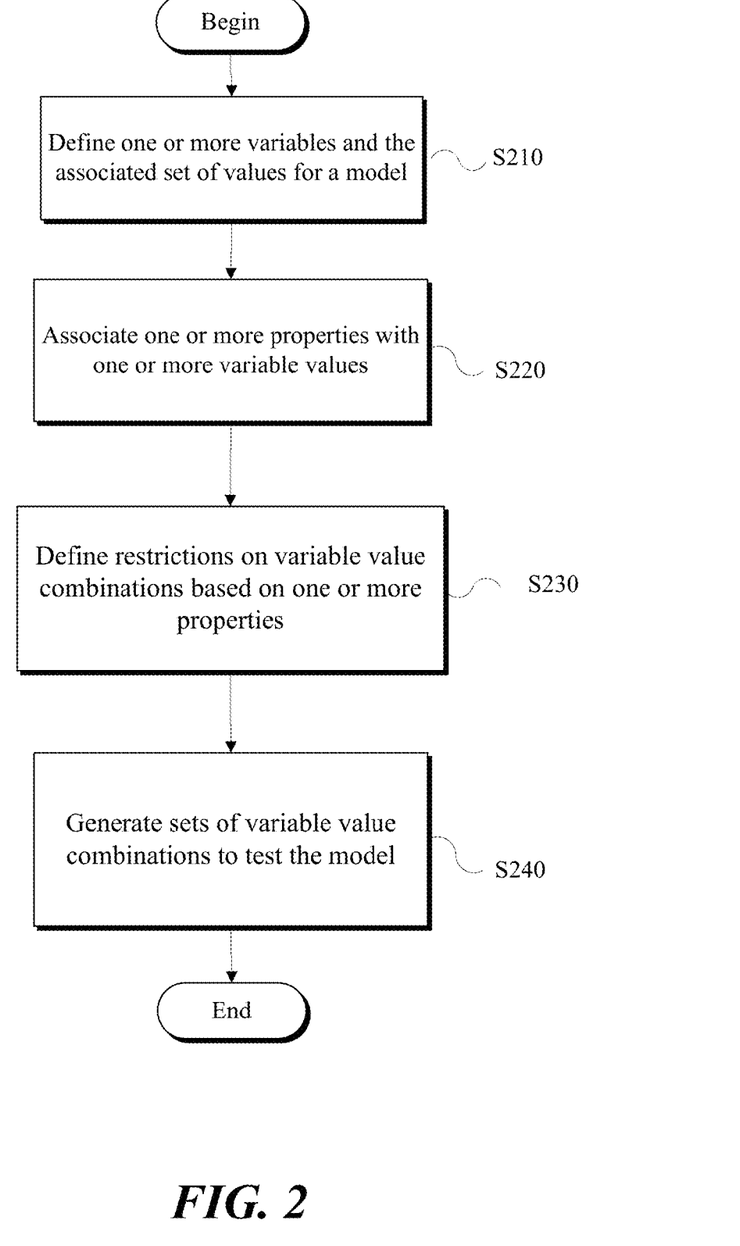
FIG. 2 is a flow diagram of an exemplary method for modeling a test space for a system, using assigned types to one or more variables, in accordance with one embodiment.

FIG. 2 is a flow diagram of an exemplary method for modeling a test space for a system, using assigned properties to one or more variables, in accordance with one embodiment. As shown, one or more variables and the associated set of values for a model are defined (S210). One or more properties may be associated with or defined for one or more variable values (S220). Restrictions on variable value combinations may be then defined based on the assigned properties (e.g., based on the properties that are common to variables in the combinations) (S230). A set of legal value combinations (e.g., test scenarios) may then be generated to test the model (S240).

The above disclosed method enhances Cartesian product based modeling in a way that allows a user to more easily define fairly sophisticated restrictions without having to use complex programming language syntax. Furthermore, a semantic abstraction of the model is induced by providing an interface that allows the user to associate properties with variable values, and enhancing restriction syntax to allow conditions based on said properties. Based on the above, one or more embodiments may be utilized to make the modeling of a system simpler without reducing the efficacy of the model, resulting in reduced costs and increased quality.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3A:
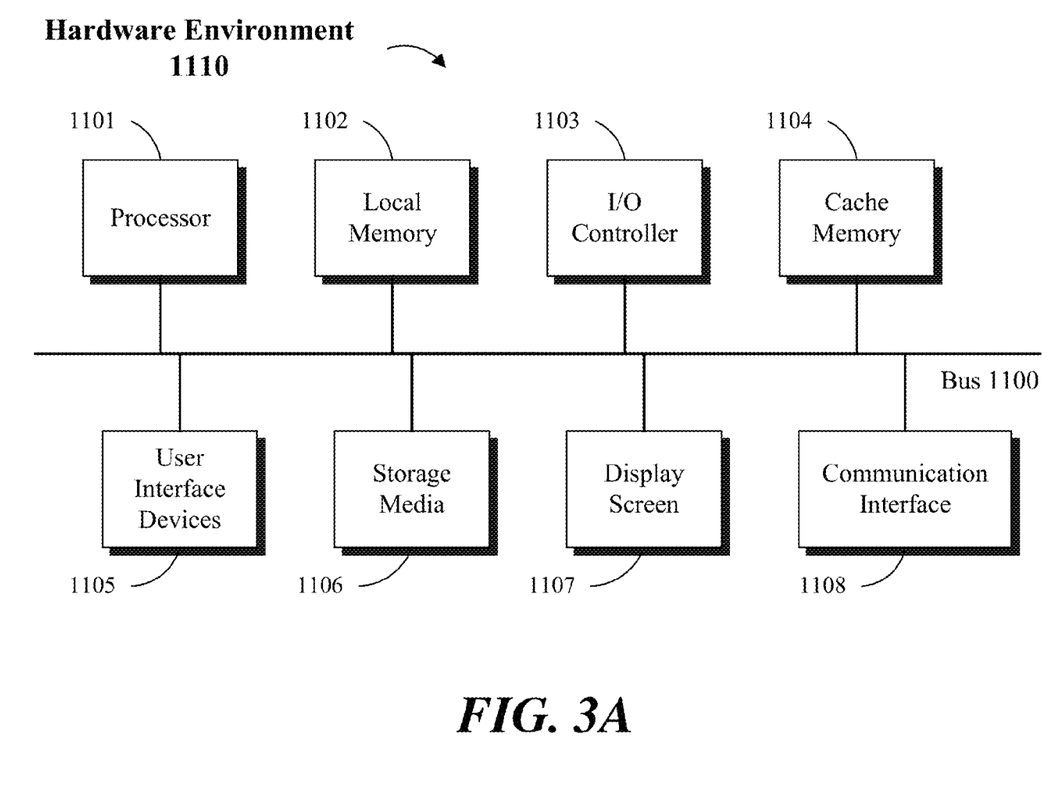
FIGS. 3A and 3B are block diagrams of hardware and software environments in which the disclosed systems and methods may operate, in accordance with one or more embodiments.
Figure 3B:
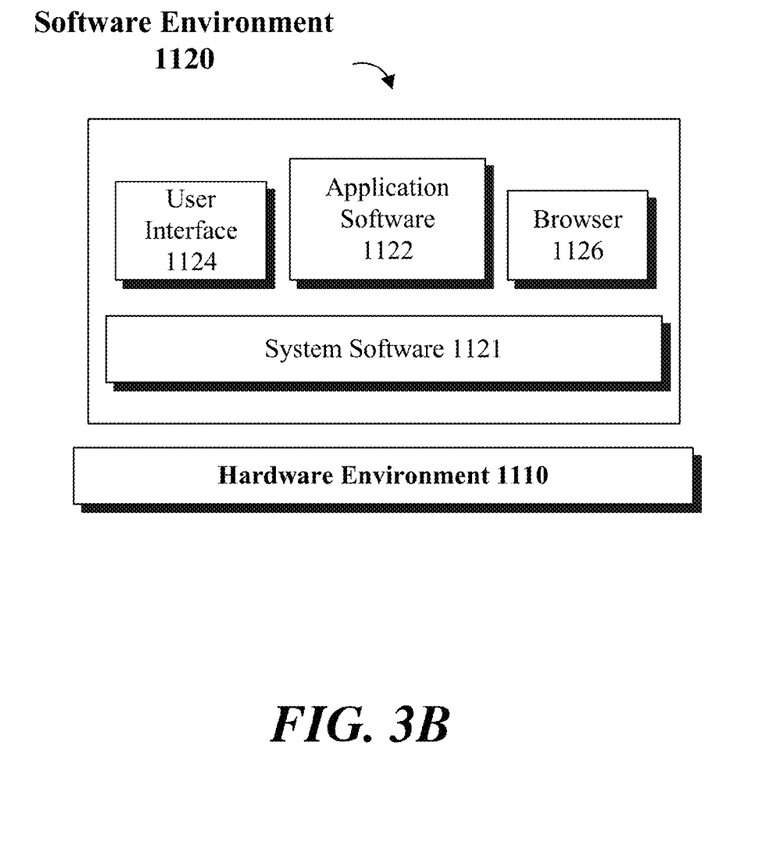

Referring to FIGS. 3A and 3B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 3B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method executable on one or more processors for modeling a test space, the method comprising:
    defining a coverage model including:

one or more variables, wherein respective values for the variables are assigned, one or more definitions of value properties for said variables with assigned values, and one or more restrictions that limit combination of variable values that are legal for the model, wherein at least one of said restrictions is defined using at least one value property.

2. The method of claim 1 wherein one or more restrictions are defined based on a common property shared among at least two variables.

3. The method of claim 1 wherein defining restrictions applicable to variable value combinations based on the value property is accomplished by way of interacting with a graphical user interface.

4. The method of claim 3 wherein a color coding scheme is used to identify variable value combinations that are illegal in the model by marking a property associated with a variable in a certain color.

5. The method of claim 3 wherein a scheme is used to identify variable value combinations that are illegal in the model by configuring a property associated with a variable in a certain font.

6. The method of claim 3 wherein a scheme is used to identify variable value combinations that are illegal in the model by configuring a property associated with a variable in a visually distinctive manner.

7. The method of claim 3 wherein the variable value properties for selected variables are displayed in a table, and restrictions are defined by marking rows or columns in the table.

8. The method of claim 2 wherein value property combinations for selected properties are displayed in a table, and restrictions are defined by marking rows or columns in the table.

9. The method of claim 1 wherein a value property for a variable defines a type associated with the variable.

10. The method of claim 1 further comprising testing the model using a set of legal variable value combinations.

11. A system comprising one or more processors for executing a method for modeling a test space, the system further comprising:

a logic unit for defining a coverage model including:

one or more variables, wherein respective values for the variables are assigned, one or more definitions of value properties for said variables with assigned values, and one or more restrictions that limit combination of variable values that are legal for the model, wherein at least one of said restrictions is defined using at least one value property.

12. The system of claim 11 wherein one or more restrictions are defined based on a common property shared among at least two variables.

13. The method of claim 11 wherein defining restrictions applicable to variable value combinations based on the value property is accomplished by way of interacting with a graphical user interface.

14. The method of claim 13 wherein a color coding scheme is used to identify variable value combinations that are illegal in the model by marking a property associated with a variable in a certain color.

15. The method of claim 13 wherein a scheme is used to identify variable value combinations that are illegal in the model by configuring a property associated with a variable in a certain font.

16. A computer program product comprising program code embedded in a non-transitory data storage medium, wherein execution of the program code on a computer causes the computer to:

define a coverage model including:

one or more variables, wherein respective values for the variables are assigned, one or more definitions of value properties for said variables with assigned values, and one or more restrictions that limit combination of variable values that are legal for the model, wherein at least one of said restrictions is defined using at least one value property.

17. The computer program product of claim 16 wherein one or more restrictions are defined based on a common property shared among at least two variables.

18. The computer program product of claim 16 wherein defining restrictions applicable to variable value combinations based on the value property is accomplished by way of interacting with a graphical user interface.

19. The computer program product of claim 18 wherein a color coding scheme is used to identify variable value combinations that are illegal in the model by marking a property associated with a variable in a certain color.

20. The computer program product of claim 18 wherein a scheme is used to identify variable value combinations that are illegal in the model by configuring a property associated with a variable in a certain font.

* * * * *